United States Patent [19]

Rogers

[11] 3,711,834

[45] Jan. 16, 1973

[54] MATRIX SWITCH HAVING ISOLATION RESISTORS

[75] Inventor: Stanley Rogers, La Jolla, Calif.

[73] Assignee: General Dynamics Corporation, San Diego, Calif.

[22] Filed: March 29, 1971

[21] Appl. No.: 129,068

[52] U.S. Cl. ............................340/166 R, 340/147 R

[51] Int. Cl. ..................................................H04q 1/18

[58] Field of Search................340/166 R; 179/18 GF

[56] References Cited

UNITED STATES PATENTS

| | | | |
|---|---|---|---|
| 2,883,467 | 4/1959 | Ketchledge | 179/18 GF |
| 2,936,402 | 5/1960 | Ketchledge | 179/18 GF |
| 2,944,114 | 7/1960 | Ketchledge | 179/18 GF |
| 3,263,225 | 7/1966 | Headle | 340/166 R X |
| 3,354,435 | 11/1967 | Picciano | 340/166 R |

*Primary Examiner*—Harold I. Pitts
*Attorney*—John R. Duncan

[57] ABSTRACT

A broad-band high-frequency matrix switch arrangement with isolation means to limit voltage variations is disclosed. A resistance means is used in the matrix switch output line immediately preceding an output amplifier to isolate the high input impedance of the amplifier from the system and to reduce high-frequency rolloff. In addition, to reduce standing waves and the resulting voltage variations along the input bus, a second resistance means is provided to isolate the matrix switch input bus from the signal source and a third resistance means is provided to isolate the input bus from the crosspoint switch. These various isolating resistance means cooperate to improve switch performance while preventing certain undesirable effects which occur when any of the several resistance means is used alone.

4 Claims, 2 Drawing Figures

INVENTOR.
STANLEY ROGERS

BY John R Duncan

ATTORNEY

MATRIX SWITCH HAVING ISOLATION RESISTORS

BACKGROUND OF THE INVENTION

In various digital-computer control applications, analog or video transmissions systems, etc., it is desirable to be able to quickly switch signals from one or more of a large number of input lines to one or more of a large number of output lines. Matrix switches are widely used in such systems. Matrix switches generally comprise a rectangular array of switches, one side of the switches being connected to input lines or buses and the other side to output buses. The switch array permits any of the input buses to be electrically connected to any of the output buses, as desired. Conveniently the input buses may be thought of as forming the rows in a rectangular matrix, with the output buses forming the columns. The individual switches are located at the intersections or crosspoints of the rows and columns.

Simple switch arrangements such as the well-known "crossbar" switch are often used in telephony, where only low frequencies are present. Also, at higher frequencies in cases where a narrow band of frequencies is present, few problems are encountered, since the system may be "tuned" for the specific signal frequency to be applied. However, many complex and interrelated problems arise where the matrix switch system must handle very high frequency broad band signals, such as video or wide-band analog signals.

A signal path through a matrix switch, from a signal input point, through an input bus, through a closed crosspoint switch, through an output bus and finally to an output point such as an output amplifier, acts as a transmission line. As seen from its input, a line terminated in its characteristic impedance looks like a resistance equal to the characteristic impedance; the line is said to be "matched" when no signal energy is reflected from the termination or any discontinuity along the line back toward the input of the line. The voltage at all points along the matched line is the same when a constant signal is applied at the input. If a line is terminated in anything other than its characteristic impedance, of if the impedance changes at any point along the line, reflections of signal energy will occur at the termination and at each point where impedance changes, setting up standing waves on the line. These standing waves cause voltage variations along the line, so that the signal picked up from different points along the line will vary in magnitude.

In many matrix switches, a short transmission line is fed by a low-impedance or matching-impedance source and is terminated in a very high impedance, causing severe signal reflections from the termination, resulting in standing electrical waves along the line. In general, the longer such a short transmission line is (in electrical degrees) the greater are the voltage variations caused by the reflections. The reduction or elimination of reflections and the voltage variations resulting from this is highly desirable in high-frequency matrix switches.

In any high-frequency matrix switch, some high-frequency rolloff will occur as a signal of sufficiently high-frequency passes through the switch. This rolloff will be "seen" at the output point, such as an output amplifier. In many applications it is desirable to compensate for such high-frequency rolloff.

Thus, there is a continuing need for improvements in high-frequency broad-band matrix switches to reduce the adverse effects of signal reflections and rolloff.

SUMMARY OF THE INVENTION

It is, therefore, an object of this invention to provide a matrix switch which substantially overcomes the above-noted problems.

Another object of this invention is to provide a matrix switch suitable for use with high-frequency broad-band signals.

Another object of this invention is to improve the uniformity of voltage along input and output buses of a matrix switch.

Still another object of this invention is to reduce high-frequency rolloff in matrix switches.

The above objects, and others, are accomplished in accordance with this invention by isolating the unterminated output stub (between the output bus and, typically, an output amplifier) from the output bus with a series resistance, and by isolating the input bus from the input terminal with a series resistance and by isolating the input bus from the crosspoint switch with another series resistance. Preferably, the length of the unterminated output stub is selected so as to minimize high-frequency rolloff.

While this invention is useful over a wide range of frequencies, it is generally of maximum benefit in applications involving frequencies over 50 MHz. In many cases, this invention has highly desirable advantages at frequencies over 100 MHz and in applications involving a very wide range of frequencies, e.g., from a few cycles per second to over 50 MHz.

Other matrix switch features and components which may for many purposes be incorporated into the switch of this invention are disclosed in my copending U. S. patent applications Ser. Nos. 129,067 and 129,087, filed concurrently with this application.

BRIEF DESCRIPTION OF THE DRAWING

Details of the invention in relation to the prior art, and of certain preferred embodiments of the invention will be further understood upon reference to the drawing, wherein.

DETAILED DESCRIPTION OF THE INVENTION

Figure 1:
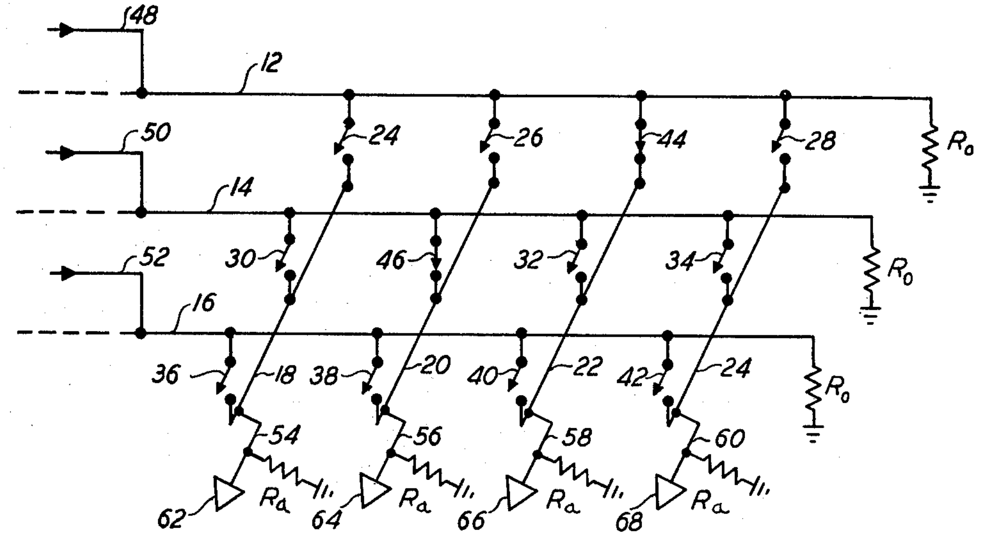
Prior Art FIG. 1
FIG. 1 is a schematic representation of a matrix switch according to the prior art, in which the present invention is useful.

Referring to FIG. 1, there is seen a simple schematic representation of a matrix switch of the sort in which the present invention can be applied. The novel features of the invention are shown in the form of a single switch element, with single input and output buses, in FIG. 2, since to illustrate an entire switch, as in FIG. 1, incorporating these novel features at every crosspoint would be unduly confusing because of the large number of circuit elements and because the complex three-dimensional array must be illustrated in two dimensions.

As shown in FIG. 1, a typical matrix switch comprises a number of input lines or buses 12, 14 and 16 and a number of output lines or buses 18, 20, 22 and 24. The input and output buses are conveniently illustrated as rows and columns, respectively. Of course, more or fewer input and output buses may be included, as desired.

Wherever input and output buses cross, an interconnecting crosspoint switch may be provided. In a large matrix switch, for example, with 15 input and 20 output buses, 300 crosspoint switches could be installed. As seen in FIG. 1, crosspoint switches 24, 26, 28, 30, 32, 34, 36, 38, 40 and 42 are open while switches 44 and 46 are closed. Thus, a signal entering from signal input line 48 and input bus 12 will pass through crosspoint switch 44, then through output bus 22 and signal output line 58 to an output signal receiving means, in this illustration amplifier 66. Similarly, a signal entering from signal input line 50 to input bus 14 will pass through crosspoint switch 46, then output bus 20 and signal output line 56 to output amplifier 64. Since none of switches 24, 30 and 36 are closed no signal (neglecting "crosstalk") will reach output bus 18, signal output line 54 and amplifier 62. Similarly, since switches 28, 34 and 42 are all open, no signal will reach output bus 24, signal output line 60 and amplifier 68.

Each input bus is terminated in a matching resistor $R_o$ which is equal to the characteristic impedance of the input bus. The input impedance of each amplifier is $R_a$, which is very large when compared to $R_o$. Where the input bus is thus "matched", no signal energy is reflected back from the termination toward the bus signal input line, with all crosspoint switches open. Such an input bus has the desirable characteristic of having the same voltage at all points along the bus when a constant signal is applied at the input.

However, a line or signal path through the switch which terminates in anything other than its characteristic impedance will have "standing waves" on it, resulting from signal energy reflections from a mismatched termination. If the impedance changes at any point along a transmission line, reflections of signal energy will occur at each such point, setting up standing waves on the line.

When a crosspoint switch is closed, an output bus is added to the circuit. For example, when switch 46 is closed, output bus 20, output transmission line 56 and the output amplifier 64 are added to the circuit. Since $R_a$, the input impedance of the amplifier, is a very high impedance relative to the characteristic impedance of input bus 14 ($R_o$), it "looks" very much like an open circuit, so that reflections occur at the termination, causing standing waves on the transmission line. For clarity, $R_a$ is shown spaced from the amplifier, in addition, the unterminated stub portion of output bus 20 near switch 26 will cause signal reflection, since this unterminated end will effectively act as a very high impedance.

These various impedance mismatches anywhere in the switch circuit cause standing waves throughout the circuit. Thus, for example, standing waves caused by the short unterminated stub between output signal receiving means, such as output amplifier 62, 64, 66 or 68, and the point at which the corresponding output transmission line 54, 56, 58, or 60 is connected to the corresponding output bus 18, 20, 22, or 24 will develop along the entire output bus and will extend back through closed crosspoint switches into the input bus, causing voltage variations throughout the circuit.

Significant high-frequency rolloff often occurs in matrix switches used with very high frequencies. Where the output transmission line is terminated in a matching impedance, whatever rolloff occurs in the switch will be seen by the amplifier. If the matching impedance (not shown in FIG. 1) is moved along the output transmission line away from the amplifier, the portion of the output transmission line between the matching impedance and the amplifier effectively constitutes an unterminated stub, assuming that the input impedance of the amplifier is very large compared to the matching impedance, which would usually be the case. A characteristic of a short open-circuited stub is a voltage rise at its unterminated (receiving) end, the amount of the rise depending on the electrical length of the stub. It is a purpose of this invention to use this characteristic of a short open-circuited stub to compensate for high-frequency rolloff elsewhere in the matrix switch. Unfortunately, this means of compensation cannot be successfully used in a conventional matrix switch such as is shown in FIG. 1. In the first place, if a matching impedance is used on the output transmission line, a mismatch will be created on the input bus when the crosspoint switch is closed. In the second place, if a matching impedance is not used, the entire output bus and output transmission line system will have standing waves on it, and these will create standing waves on the input bus. This problem is overcome by the novel combination of features of this invention, as discussed in conjunction with FIG. 2 below.

Figure 2:
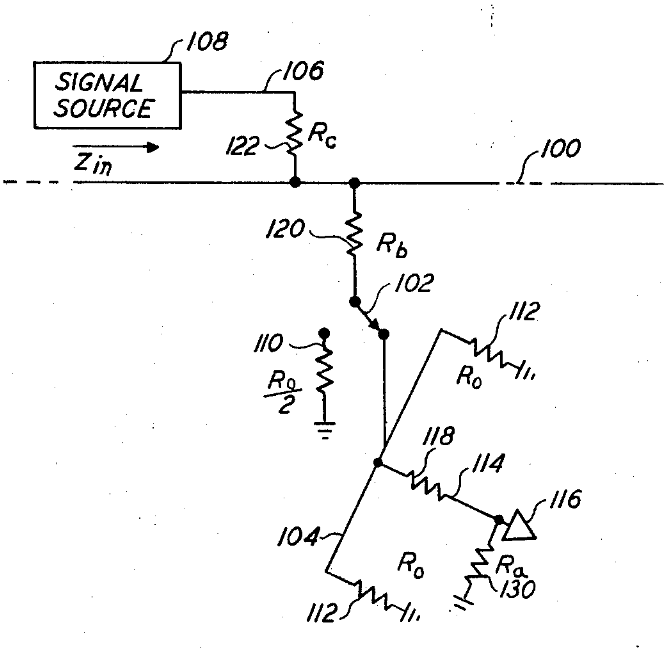
FIG. 2 is a schematic representation of a portion of a matrix switch illustrating a preferred embodiment of this invention.

The novel features of the present invention are schematically illustrated in FIG. 2 in conjunction with a portion of a matrix switch. FIG. 2 shows a single input bus 100, a single crosspoint switch 102 and a single output bus 104. In this switch, a signal enters along signal input line 106 from signal source 108, which may be a standard transmission line. The signal enters input bus 100 and reaches crosspoint switch 102, which can direct the signal either to a dummy load 110 (having a resistance of $R_o/2$ the equivalent of the parallel combination of the two terminal resistors on the output bus) or to output bus 104. Output bus 104 is preferably terminated at each end in impedance matching resistors 112 having resistances $R_o$ which match the impedance of the output bus 104. Finally, if switch 102 is closed as shown in FIG. 2, the signal passes from output bus 104 through signal output line 114 to an output signal receiving means 116, which may be an output amplifier.

Output line 114 between output bus 104 and amplifier 116 constitutes an unterminated stub which could cause undesirable signal reflections, as discussed above. It has been found, however, that by placing series resistance (resistor 118) in line 114, (a) the standing waves can be sharply reduced, improving uniformity of voltage, or (b) the standing waves can be controlled to offset the high-frequency rolloff occuring elsewhere in the matrix switch. In the absence of resistor 118, the signal from the relatively low impedance source will be largely reflected from the relatively high-impedance input of amplifier 116 (represented by Ra, resistor 130). This reflected signal would be propagated to other points in the circuit, resulting in standing waves on the buses, with consequent voltage variations and amplitude distortions along the buses.

The longer a short line (such as line 114) is in electrical degrees, the greater are the voltage variations caused by the reflections. For application (a) of the preceding paragraph voltage uniformity can be improved by shortening the line or by absorbing some of the reflected energy. In order to compensate for rolloff (application (b) above), as discussed below, the unterminated portion of line 114 itself should not be too short. However, in both applications the addition of resistor 118 acts to absorb reflected energy and effectively shortens line 114. First, since resistor 118 forms a discontinuity in the line, some (typically, a small amount) of the signal energy is reflected from it, rather than proceeding all the way of amplifier 116 before being reflected. The energy that reaches amplifier 116 and is reflected will reach resistor 118 on its way back to cross-point switch 102. By choosing resistor 118 so that, in combination with the source impedance of the signal as seen from resistor 118, it matches the impedance of the output line, no energy is reflected from resistor 118 back toward amplifier 116, thus reducing the standing waves on the unterminated portion of the unterminated portion of the output transmission line 114 between resistor 118 and amplifier 116. Only a small fraction of the energy reflected from amplifier 116 will pass through resistor 118 and reach crosspoint switch 102, thus reducing the standing waves that reach the output bus and the input bus.

In application (a) resistor 118 performs two functions: First, it greatly reduces the amount of energy which is reflected back to crosspoint switch 102 and input bus 100 from amplifier 116, which reduces the standing waves substantially, and, second, resistor 118 causes some energy to be reflected from it rather than from amplifier 116. Since resistor 118 is closer to the crosspoint than is amplifier 116, the voltage variation caused by this reflected energy is smaller than the voltage variation that would be caused if the same energy were reflected from amplifier 116.

In application (b) the use of resistor 118 in line 114 further permits the length of line 114 to be selected to provide maximum rolloff compensation. Line 114 is unterminated, so that there will be a voltage rise at amplifier 116, the amount depending upon the electrical length of line 114. In practical applications the length of line 114 may conveniently be empirically determined so as to compensate for the voltage attenuation or rolloff which is found to have occurred in the particular switch circuit. Of course, the range of compensation by this technique is limited by the differing natures of high-frequency rolloff, (which for the circuit from signal input to resistor 118 is typically monotonic) and of voltage variations along an unterminated transmission line, which is periodic. Preferably, line 114 should be less than 90 electrical degrees long. For small amounts of compensation, excellent results have been obtained.

The switch of this invention further includes resistance means isolating input bus 100 from the output system (crosspoint switch 102, output bus 104, etc.) and resistance means isolating input bus 100 from the input system (input line 106, source 108, etc.). Isolation from the output system has the advantage that reactive impedances in the output system have little effect on the input bus, minimizing voltage variations thereon. Isolation of the input system prevents the transmission of reflections on the input bus back to the signal source. Output system isolation is accomplished by inserting a series resistor 120, having a resistance $R_b$ at the crosspoint between input bus 100 and switch 120. Isolation of the input system from the input bus is accomplished by inserting a series resistor 122 having resistance $R_c$ in signal input line 106 near the connection pint with input bus 100.

Resistor 120 will extend the useful frequency range of the switch upward by reducing standing waves on input bus 100. However, resistor 120 creates a rolloff network which will somewhat increase high-frequency voltage rolloff through the circuit. This rolloff, can be largely compensated by the combined use of resistor 118 and length adjustment of the unterminated portion of line 114 between resistor 118 and amplifier 116, as discussed above. This type of compensation is most useful at frequencies above 100 MHz since line 114 is usually only a few inches long. The maximum compensation usually attainable is about 6 dB.

For optimum performance, the values of $R_c$, $R_b$ and $R_o$ should be carefully chosen. The attenuation "A" between the input terminal 106 and the input bus 100 should normally be in the range of about one-fifth to one-half and, of course, the input impedance should equal the impedance of the incoming line. A typical matrix switch may have "N" crosspoints of the sort shown in FIG. 2. For $A = ½$, the resistance of N sets of $R_b$ (resistor 120) in series with $R_o/2$ (the output system or the dummy load, depending on which way the crosspoint switch 102 is set) should equal $R_c$. For $A = ⅓$, the resistance of the parallel sets would be half of $R_c$, for $A = ¼$ it would be one-third of $R_c$, etc.

For each crosspoint, the attenuation "B" between the input bus and the output bus can usually be about ½. Preliminary choices of A and B for a particular $Z_{in}$ and N should be such that the bus impedances which result are reasonable and that the requisite amplifier (to make up the total attenuation AB) is practical.

Component values for a typical matrix switch design can be established in the manner illustrated by the following example: Given the input impedance $Z_{in}$ as 50 ohms, the number of crosspoints N as 6 and the gain required of the amplifier over the bandwidth of the matrix switch, 1/AB as 8, select say, $A = ¼$ and $B = ½$. Using these values, other parameters may be calculated as follows:

$R_c = (1 - A)Z_{in} = ¼ \times 50 = 37.5$ ohms $(R_b + R_o 12)/(N) = AZ_{in} = ¼ \times 50 = 12.5$ ohms.

Since $N = 6$, $R_b + R_o/2 = NAZ_{in} = 6 \times 12.5 = 75$ ohms $R_b = (1 - B)NAZ_{in} = ½ \times 75 = 37.5$ ohms $R_o/2 = B \times NAZ_{in} = ½ \times 75 = 37.5$ ohms $R_o = 75$ ohms.

If the input bus is center-fed the impedance looking both ways from the feed point is twice $AZ_{in}$ since the two arms of the bus are in parallel. The output bus is then 75 ohms, a convenient value.

Other suitable sets of parameters may be similarly established for other switches or to meet particular or special requirements.

Although specific components, values and proportions are provided in the above description of a preferred embodiment of this invention, other arrangements and variations may be used, where suitable, with similar results. Other applications and modifications of the present invention will occur to those skilled in the art upon reading this disclosure. These are intended to be included within the scope of this invention, as defined in the appended claims.

I claim:

1. A wide-band high-frequency matrix switch comprising:

a. a plurality of input buses;

b. signal input lines for feeding wide-band high-frequency signals from signal sources through an input terminal to each of said input buses;

c. a first isolation resistor in series in each of said signal input lines adjacent to each input bus, each of said first isolation resistors having a resistance value equal to $(1-A)\ Z_{in}$ where A is the desired attenuation between the input terminal and the input bus and $Z_{in}$ is the input impedance;

d. a plurality of output buses located adjacent to said input buses;

e. signal output lines correcting each of said output buses to an output signal receiving means;

f. a second isolation resistor in series in each of said signal output lines adjacent to each output bus, each of said second isolation resistors having a resistance value which, in combination with the source impedance of the signal as seen from second isolation resistor, matches the impedance of said output line;

g. a plurality of crosspoint switches adapted to selectively connect at least some of said input buses to output buses; and h. a third isolation resistor in series in each crosspoint line between each crosspoint switch and its corresponding input bus, each of said third resistors having a resistance value equal to $(1-B)NAZ_{in}$ where B is the desired attenuation between the input bus and the output bus, N is the number of crosspoints in the matrix switch, A is the desired attenuation between the input terminal and the input bus and $Z_{in}$ is the input impedance.

2. The matrix switch according to claim 1 wherein the length of each of said signal output lines is selected to minimize high-frequency rolloff effects.

3. The matrix switch according to claim 1 further including dummy loads to which each crosspoint switch is connected when said switch is not connected to an output system.

4. The matrix switch according to claim 3 wherein each of said dummy loads has a resistance value equal to $\frac{1}{2}(B \cdot N \cdot A \cdot Z_{in})$ where B is the desired attenuation between the input bus and the output bus, N is the number of crosspoints along the input bus, A is the desired attenuation between the input terminal and the input bus, and $Z_{in}$ is the input impedance.

* * * * *